June 27, 1961 H. E. SCHARFENBERG 2,989,958
NEUTRAL PUSH BUTTON TRANSMISSION CONTROL AND STARTER SWITCH
Filed July 9, 1956 3 Sheets-Sheet 3
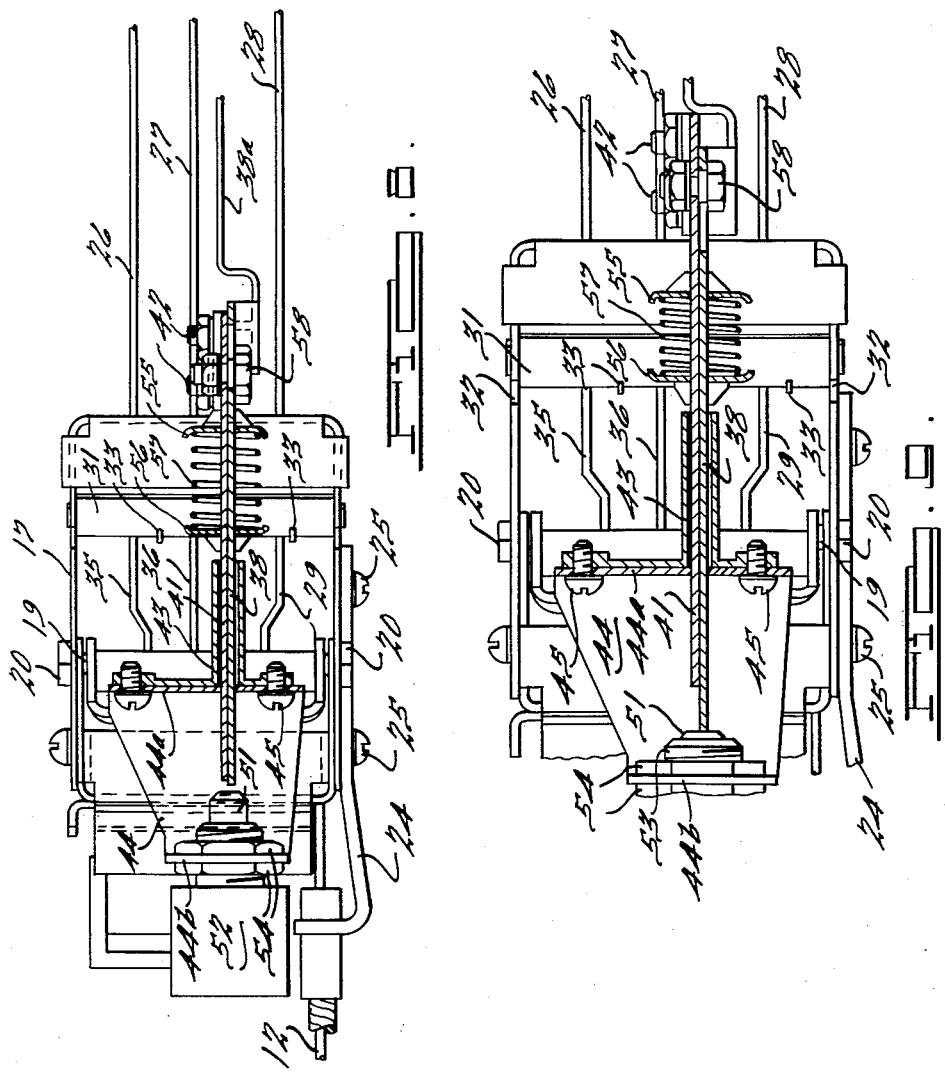
INVENTOR.
Howard E. Scharfenberg
BY
Harness & Harris
ATTORNEYS

United States Patent Office 2,989,958
Patented June 27, 1961

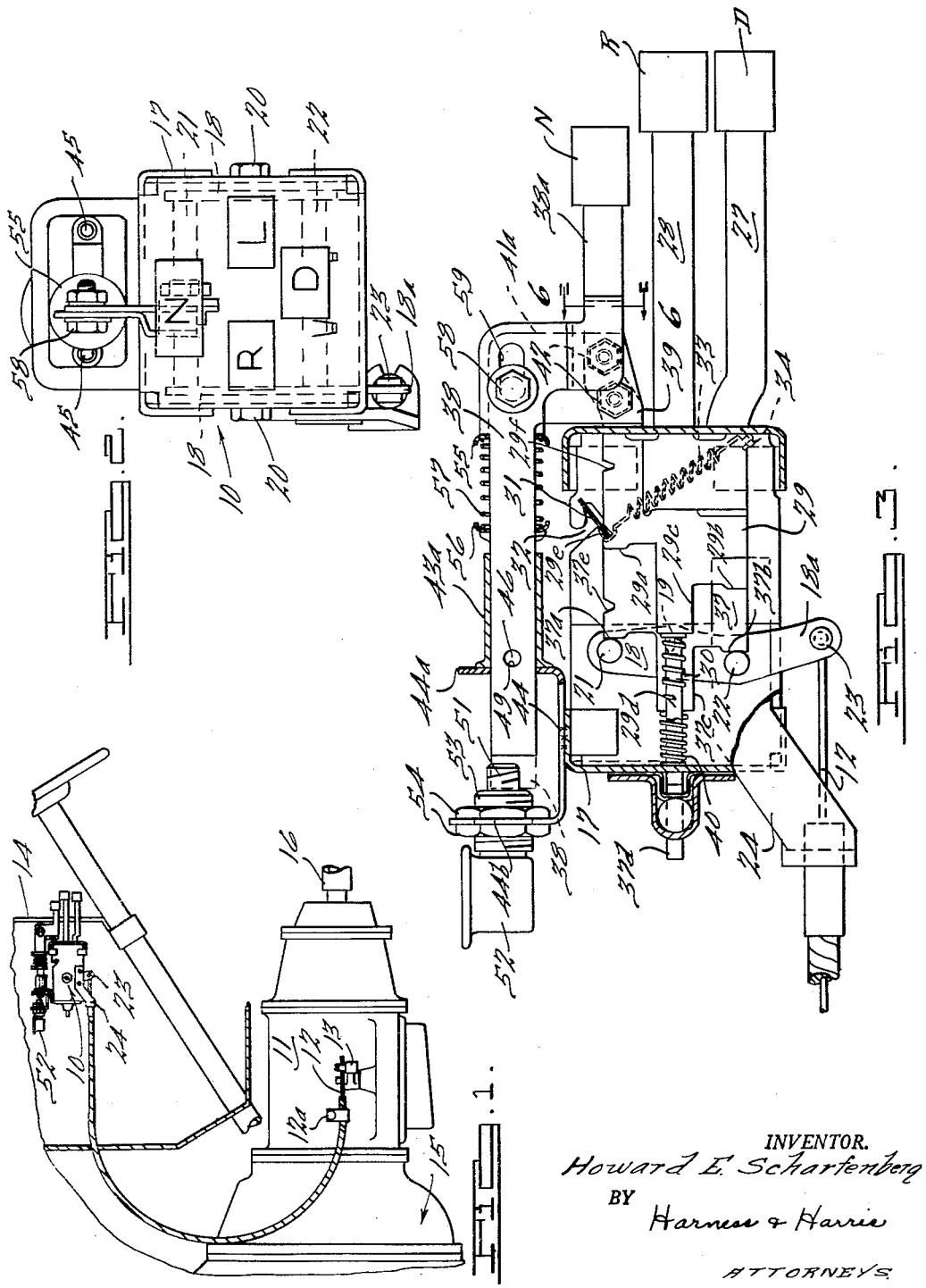

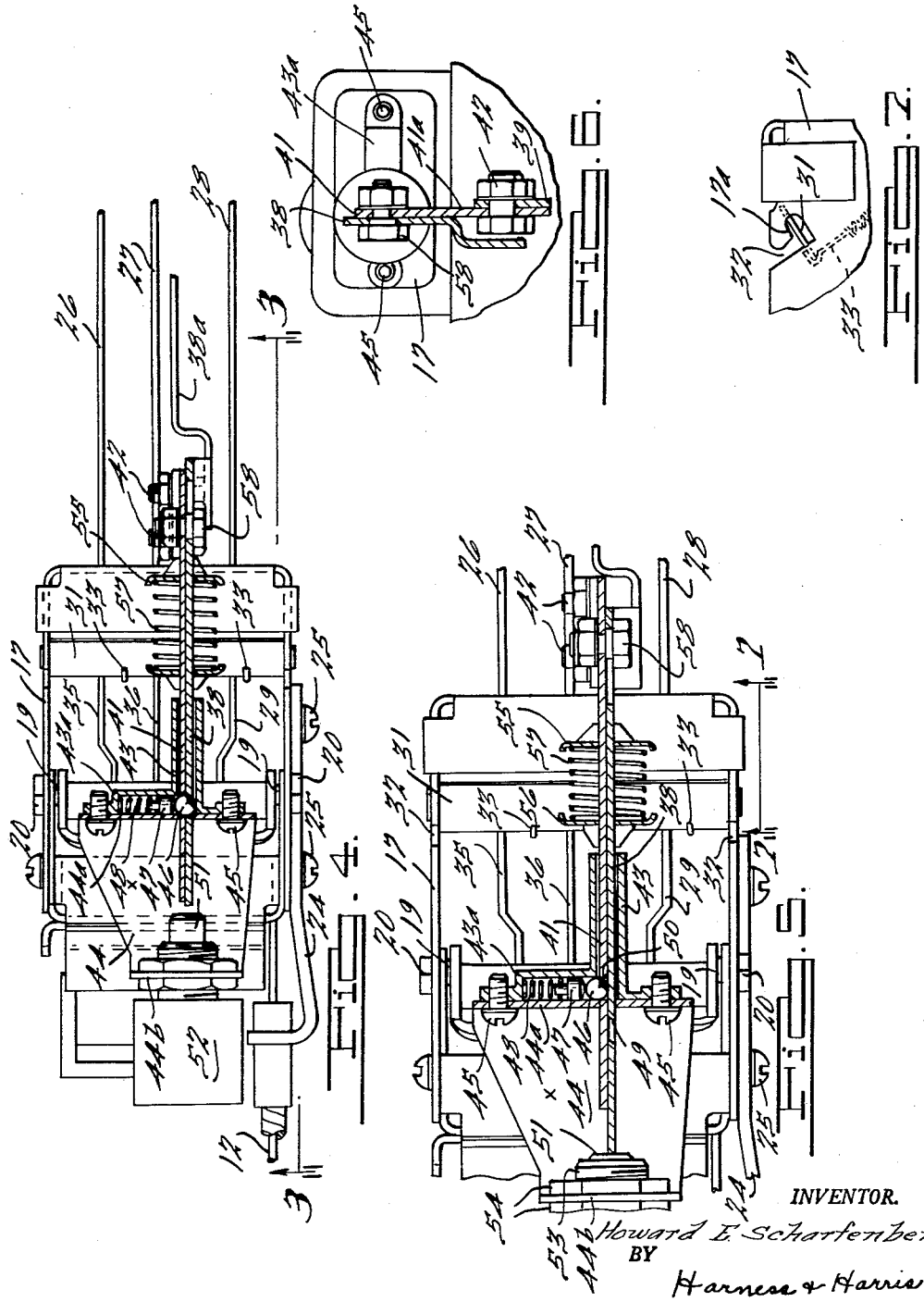

2,989,958
NEUTRAL PUSH BUTTON TRANSMISSION CONTROL AND STARTER SWITCH
Howard E. Scharfenberg, Orchard Lake, Mich., assignor to Chrysler Corporation, Highland Park, Mich., a corporation of Delaware
Filed July 9, 1956, Ser. No. 596,529
22 Claims. (Cl. 123—179)

This invention relates to improvements in an automobile transmission control mechanism and starter switch arrangement, and in particular to a push button type control mechanism for a multiple-position transmission wherein operation of a starter switch to energize the vehicle starting motor is dependent upon first positioning the transmission mechanism in a neutral position.

In a common automobile construction employing a multiple-position transmission mechanism, a number of personally operable levers or push buttons including a neutral lever or push button are provided for selectively shifting the transmission mechanism to a desired speed-ratio position or to a neutral position, thereby to control the speed or power ratio between the vehicle engine and the driving wheels. In order to minimize the load on the customary electrical starting motor and to assure that no power will be transmitted to the driving wheels during starting of the vehicle engine, it is desirable for the transmission mechanism to be in the neutral position when the starting motor is energized.

Although the association of a switch with push button transmission control devices is not of itself new, as for example in the provision of a backup light switch adapted to be actuated to energize a backup light when the transmission mechanism is shifted to a reverse drive position, a number of problems peculiar to the association of a starter switch with a neutral transmission operating lever arise particularly because of dimensional and operational characteristics of the neutral transmission operating mechanism and also because of special conditions that must be satisfied. Thus for example the starter switch must be closed only when the transmission mechanism is in the neutral position, but not every time that the transmission is in the neutral position.

It is accordingly an important object of the present invention to provide a particularly simple, economical, and effective answer to the aforesaid problems comprising an improved compact construction in a transmission control mechanism which is cooperable with an electrical switch for energizing the starting motor, whereby the latter can be energized only after the neutral lever and transmission mechanism are shifted to a neutral position.

Another object is to provide such a construction which can be feasibly employed with existing transmission control mechanisms with a minimum of expense for new materials and the reconstruction of existing parts.

Another object is to provide such a construction comprising a starter switch in an operative electrical circuit normally effective to de-energize the electric starting motor in combination with a neutral transmission operating lever adapted to be selectively shifted to a neutral position to cause corresponding shifting of the transmission mechanism to the neutral position, the operating lever being then susceptible of limited overtravel to a second position without causing the transmission mechanism to shift from its neutral position and being also effective at the second position to actuate the starter switch and thereby to energize the starting motor.

Another and more specific object is to provide an improved neutral operating lever and starter switch arrangement wherein the lever is operatively connected with a transmission selector element to shift the transmission to the neutral position and is adapted to override the selector element at the neutral position, thereby to move to the second position to actuate the starter switch and energize the starting motor, the selector having portions engageable at the second position with the control means to hold the latter and transmission mechanism positively at the neutral position when the engine is being started.

Other objects of this invention will appear in the following description and appended claims, reference being had to the accompanying drawings forming a part of this specification wherein like reference characters designate corresponding parts in the several views.

FIGURE 1 is a diagrammatic fragmentary elevational view of a vehicle transmission mechanism associated with a push button type control mechanism embodying the present invention.

FIGURE 2 is an enlarged front elevational view of the push button control mechanism of FIGURE 1 removed from the vehicle body.

FIGURE 3 is an enlarged side elevational view of the push button control mechanism of FIGURE 2, showing the neutral operating lever in the neutral position.

FIGURE 4 is a plan view of the push button control mechanism of FIGURE 2.

FIGURE 5 is an enlarged view similar to FIGURE 4, showing the neutral operating lever in the starter switch actuating position.

FIGURE 6 is a fragmentary sectional view taken in the direction of the arrows substantially along the line 6—6 of FIGURE 3.

FIGURE 7 is a fragmentary elevational view illustrating an end of the transverse detent member, taken in the direction of the arrows substantially along the line 7—7 of FIGURE 5.

FIGURE 8 is a view similar to FIGURE 4, but illustrating a modified structure.

FIGURE 9 is a view similar to FIGURE 5, but illustrating the modification of FIGURE 8.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figures 1 through 7, a push button operated transmission control mechanism 10 is operatively connected with an automobile transmission mechanism, indicated generally by the numeral 11, by means of a sheathed Bowden cable 12 connected to a movable gearshift lever 13. In the present instance the transmission control mechanism is mounted below the vehicle cowl forwardly of the dash panel 14 and is provided with four manually operable levers extending through the dash panel and terminating in push buttons identified by the letters N, R, L, and D, FIGURE 2, selectively operable to shift the transmission mechanism to operating positions commonly designated as neutral, reverse, low, or drive, respectively.

In the reverse, low, or drive positions, the transmission 11 operatively connects the engine assembly 15 with the drive shaft 16, which in turn is connected through a differential with the vehicle driving wheels, all in a manner well known to the art. In the neutral position of the transmission 11, the engine assembly 15 and driveshaft 16 are disconnected from each other, enabling the engine to be started and raced without transmitting power to the driving wheels. The construction described thus far may be conventional and is accordingly not described in further detail. A fragment of the steering wheel and column are shown in FIGURE 1 to facilitate orientation of the structure shown.

The transmission control mechanism 10 comprises a sheet metal housing 17 suitably supported immediately forwardly of the dash panel by bracket means, not shown. A pair of vertically swinging rocking levers 18 are pivotally mounted on the coaxial stud shanks or pivots 19 of a corresponding pair of bolts 20 secured to opposite side walls of the housing 17, each lever 18 being located adjacent the interior of one of each of the lateral side walls of the housing 17, FIGURE 2. Upper and lower cross rods 21 and 22 connect the upper portions and lower portions respectively of the levers 18 at locations equidistant from the axis of the pivots 19. The lower end of the left hand lever 18 extends downwardly from the adjacent cross rod 22 and is secured at 23 to the upper end of cable 12. A bracket 24 secured to the left side of the housing 17 by screws 25 is also suitably secured to the upper end of the sheath for cable 12, FIGURE 4, the lower end of the sheath being suitably secured at 12a to the housing for the transmission 11 adjacent the lever 13. It is apparent that upon swinging of the levers 18 about the axis of the studs 19, the lower extension 18a secured to the cable 12 will shift the same and thereby shift the lever 13 and transmission mechanism 11.

In order to swing the extension 18a, an operating lever means described below, is associated with each of the push buttons N, R, L, and D. As illustrated, the push buttons L, D, and R are secured to the rearward ends of operating shafts 26, 27 and 28 respectively, which extend forwardly through the dash panel and into the housing 17. The shaft 28 for the reverse push button R is integral with a transmission-position selector element 29 within the housing 17 and has forward upper and lower selector surfaces 29a and 29b adapted to engage the cross rods 21 and 22 respectively, FIGURE 3, upon forward movement of the push button R. The surfaces 29a and 29b are offset from each other longitudinally of the selector element 29, so that when these surfaces move into engagement with the cross rods 21 and 22, the rocking levers 18 will be swung to a predetermined inclined position, causing forward shifting of the cable 12 to a reverse position whereat continued forward movement of the push button R is prevented by the movement limiting action of the cross rods 21 and 22.

A central portion 29c of the element 29 extends forwardly beyond the surfaces 29a and 29b and terminates in a vertically reduced spring retainer 29d which projects through the forward end of housing 17. A coil spring 30 around the retainer 29d and under compression between the forward wall of the housing 17 and the shoulder at the juncture of the retainer 29d with the extension 29c yieldingly urges the selector element 29 and push button R rearwardly to the position shown in FIGURE 3. The selector element 29 is releasably retained in the position of FIGURE 3 by means of a detent 31 having a lower edge engaged within a notch 29e in the upper surface of the element 29. The detent 31 extends transversely across the housing 17 and is provided with opposite reduced ends pivotally retained within the feet portions of boot-shaped slots 32 in the opposite side walls of the housing 17. As illustrated in FIGURE 7, the detent 31 is maintained in a rearwardly inclined position, its upper edge being prevented from swinging forwardly by means of overhanging portions 17a of the housing 17, and its lower edge being yieldingly urged rearwardly by a pair of forwardly inclined springs 33 having their upper and lower ends secured to said lower edge and to tabs 34 respectively lanced from the housing 17. During forward shifting of the reverse push button R from the position shown in FIGURE 3, the lower edge of the detent 31 is swung upwardly to the position illustrated in FIGURE 7 by engagement with the upper edge of the element 29. At the forward limit of movement of the element 29 in engagement with the cross rods 21 and 22 as described above, a second notch 29f formed in the upper edge of the element 29 similarly to the notch 29e engages the detent 31 to prevent rearward movement of the element 29 and reverse push button R as urged by spring 30.

Integral with the operating shafts 26 and 27 are corresponding transmission-position selector elements 35 and 36 similar in construction and operation to the selector element 29, except that the angular relationship of their upper and lower selector surfaces corresponding to the surfaces 29a and 29b are arranged to shift the cross rods 21 and 22 to different angular positions, thereby to adjust the cable 12 and lever 13 to predetermined positions corresponding to the low and drive positions respectively of the transmission mechanism 11. Accordingly elements 35 and 36 are not illustrated in detail.

The operating lever means associated with the neutral push button N comprises a selector element 37, operating lever 38, and suitable driving means coupling the element 37 and lever 38 for movement in unison as described below. Similarly to the selector elements 29, 35, and 36, which are integral with their respective operating shafts 28, 26, and 27, the neutral selector element 37 is provided with an integral shaft 39 extending rearwardly through the housing 17. The forward portions of the element 37 are formed to provide upper and lower selector surfaces 37a and 37b engageable with the cross rods 21 and 22 respectively when the element 37 is shifted forwardly to the neutral position shown in FIGURE 3. At this position the rocking levers 18, cable 12, lever 13 and transmission mechanism 11 will be shifted to a neutral position whereat the engine assembly is disconnected from the drive shaft 16.

A forward central portion 37c of the element 37 terminates in a vertically reduced spring retainer 37d which extends forwardly through the housing 17. Similarly to the extension 29d which carries the spring 30, the extension 37d carries a spring 40 under compression between the forward wall of the housing 17 and the shoulder of the extension 37c at the rear of the retainer 37d, thereby to urge the element 37 rearwardly from the neutral position shown. Also similarly to the notches 29e and 29f, a pair of detent retaining notches are formed in the upper surface of the element 37, the forward notch 37e being illustrated in FIGURE 3, the rearward notch containing the lower edge of the detent 31 in FIGURE 3 being coextensive with the notch 29e and concealed thereby.

The shaft 39 terminates rearwardly adjacent the housing 17 and is secured by bolts 42 to a depending leg 41a of a vertically offset member 41. The member 41 and lever 38 extend side-by-side longitudinally of the housing 17 and above the latter within a guide housing 43 secured by screws 45 to an upturned rearward flange 44a of an upper bracket 44, the bracket 44 being in turn suitably secured to the upper surface of the housing 17, as for example by being welded thereto. The guide housing 43 comprises a tubular channel of rectangular section extending rearwardly from the flange 44a and closely supporting the lever 38 and member 41 slidable therein. Rearwardly of the flange 44a, a lateral portion 43a of the housing 43 cooperates with the flange 44a to form a transverse guide channel containing a spherical key or ball 46, plunger 47, and coil spring 48 under compression between the plunger 47 and lateral portion 43a, so as to urge the ball 46 toward the member 41. A pair of mating holes 49 and 50 in the lever 38 and member 41 respectively are adapted to receive the ball 46, FIGURE 4, to interlock the lever 38 and member 41 for movement in unison. A downwardly offset portion 38a of the lever 38 extends rearwardly from shaft 39 and terminates in the neutral push button N by which it is actuated.

As is apparent from FIGURE 4, upon rearward shifting of the lever 38 from the neutral position shown, the ball 46 keying the lever 38 and member 41 together will ride rearwardly along the channel of the guide housing 43, causing the member 41 and correspondingly the selector element 37 to move in unison with the lever 38. Likewise forward movement of the lever 38 will cause forward movement of the member 41 in unison as long as the ball 46 remains in the guide housing 43 rearwardly of the neutral position of FIGURE 4. When the ball 46 reaches the neutral position, the selector surfaces 37a and 38b will engage the cross rods 21 and 22, FIGURE 3, and stop continued forward movement of the element 37 and member 41. Accordingly upon continued forward movement of the lever 38, the ball 46 will be cammed transversely against the plunger 47, FIGURE 5, by the edges of the hole 49 which diverge forwardly from the member 41 to facilitate the transverse camming action and move the ball 46 from the path of the lever 38.

In consequence of the foregoing construction, continued forward pressure on the neutral push button N after the lever 38 and member 41 are shifted to their neutral positions will cause continued forward movement of the lever 38 independently of the lever 41 into engagement with the plunger 51 of a limit switch 52 having a screw threaded portion 53 secured by retaining nuts 54 to a forward flange 44b of the bracket 44. The limit switch 52 is in an operative circuit with an electric starting motor, not shown, to energize the latter when plunger 51 is moved forwardly by engagement with the forward end of lever 38, as illustrated in FIGURE 5. In order to prevent the starting motor from being energized inadvertently when the engine 15 is already running, a suitable vacuum switch operated from the engine manifold pressure can be employed in series with the starting motor.

Rearwardly of the guide 43, two spring retainer cups 55 and 56 secured to the lever 38 and member 41 respectively are spaced by a spring 57 under compression around the lever 38 and member 41 and urging rearward movement of the lever 38 with respect to the member 41. Additional guiding and supporting means for the lever 38 provided rearwardly of the retainer 55 comprise a bolt 58 secured to the member 41 and extending in sliding relation through a longitudinal movement limiting slot 59 in the lever 38. As is also apparent from FIGURE 5, slot 59 bottoms against bolt 58 when shaft 38 moves forwardly to actuate switch 52, thereby to hold member 41 and selector element 37 positively in the neutral position without reliance on spring 57. In consequence, when the starter switch 52 is actuated, rocker 18 is positively held in the neutral position by element 37 and the positioning of the transmission mechanism at the neutral position is assured.

Summarizing the foregoing construction, the neutral push button N is integral with the operating lever 38 which has an operative driving connection with the member 41, comprising spring 57 and the ball 46. Upon forward movement of any one of the push buttons from its rearmost position, the upper surface of the associated selector element will raise the detent 31, thereby to permit spring urged return movement of the selector element associated with any other push button and which might happen to be at its forward position in engagement with the cross rods 21 and 22. Thus when the neutral selector element 37 is at the position illustrated in FIGURE 3, upon forward movement of the reverse push button R by way of example, the detent 31 will be raised from the rearmost detent notch in the element 37 to enable the latter to be returned by spring 40 to its rearmost position, whereat detent 31 will engage notch 37e.

Similarly upon forward movement of the neutral push button N from its rearmost position, the ball 46 riding in the guide 43 will cause forward movement of the member 41 and attached selector element 37 in unison with the lever 38, whereupon any other selector element which had been previously actuated to shift the transmission 11 to a power transmitting position will now be released from the detent 31 and returned by spring action as aforesaid to its rearward position. When the element 37 is finally moved to its neutral position, the transmission 11 will also be shifted to the neutral position, the ball 46 will be aligned with the transverse channel of the lateral guide portion 43a, and the detent 31 will be engaged with the rearward notch in the upper portion of the element 37 (corresponding to the notch 29f) to maintain the element 37 in the neutral position. If it is desired to start the engine, the neutral button N will be pushed forward additionally from the neutral position to move the forward end of lever 38 into engagement with limit switch plunger 51 as described during which movement the ball 46 will be cammed from hole 49 and member 41 and element 37 will remain at their neutral positions, FIGURES 3 and 5.

The ball interlock 46 is employed where a positive interlock between lever 38 and member 41 is desired. It is apparent however that in the absence of the ball 46, the spring 57 will effect a resilient driving connection between lever 38 and member 41, as illustrated in FIGURES 8 and 9 wherein the same structure as in FIGURES 4 and 5 is shown except that the lateral guide portion 43a, ball 46, plunger 47, spring 48, and holes 49 and 50 are eliminated. Thus in FIGURES 8 and 9, upon forward movement of the neutral push button N from its rearmost position, the integral lever 38 and attached spring retainer 55 will also move forward, causing spring 57 to move forward and yieldingly drive retainer 56 and the attached member 41 forward, thereby also moving element 37 forward to the neutral position. At the latter position, continued forward movement of the element 37 will be blocked by the selector surfaces 37a and 37b simultaneously engaging the cross rods 21 and 22, and the transmission mechanism 11 will have been shifted to its neutral position as above described.

When it is desired to energize the starting motor for the engine 15, the neutral push button N is pushed forward from the neutral position until movement limiting slot 59 bottoms against bolt 58. Inasmuch as forward movement of element 37 is blocked at the neutral position, additional forward movement of the attached member 41 and spring retainer 56 is also blocked. Spring 57 will thus be compressed as it yields to enable forward movement of the lever 38 into engagement with the limit switch actuator 51 to energize the starting motor. Upon release of the push button N, spring 57 returns lever 38 to the position of FIGURE 8. Likewise when element 37 is released from detent 31 as above described, spring 40 returns element 37 and the integral member 41 and retainer 56 to their rearmost positions. Accordingly spring 57, urged rearwardly by retainer 56, will drive retainer 55 and the integral lever 38 and push button N to their rearmost positions. In order to prevent the starting motor from being energized inadvertently when the engine 15 is already running, a suitable vacuum switch operated from the engine manifold pressure can be employed in series with the starting switch.

I claim:

1. In a control device for a transmission shift mechanism shiftable to various operating conditions including a neutral condition, electric switch means for an engine starter, a shiftable selector element for shifting said mechanism, said selector element being shiftable to a neutral position to shift said mechanism to said neutral condition, a shiftable operator, driving means cooperable with said element and operator to shift said element to said neutral position upon shifting of said operator in a given direction, said operator being shiftable relative to said element beyond the latter at said neutral position and having a portion effective to actuate said switch means upon continued shifting of said operator in said direction beyond said element at said neutral position.

2. In a control device for a transmission shift mechanism shiftable to various operating conditions including a neutral condition, electric switch means for an engine starter, personally movable operating means having an element cooperable with said mechanism to shift the same to said neutral condition upon movement of said operating means in one direction, movement limiting means holding said mechanism at said neutral condition upon continued movement of said operating means in said direction, and means on said operating means cooperable with said switch means to actuate the same upon said continued movement of said operating means.

3. In a control device for a transmission shift mechanism shiftable to various operating conditions including a neutral condition, electric switch means for an engine starter, a selector element shiftable to move said mechanism by engagement therewith, said selector element being shiftable to a neutral position to shift said mechanism to said neutral condition, a shiftable operator, keying means at a keying position operably connecting said operator and element for movement in unison to shift said selector element to said neutral position upon corresponding shifting of said operator, said keying means being relatively shiftable from said keying position when said element and operator are at said neutral position, said operator having a portion arranged to actuate said switch means upon predetermined movement of said operator from the neutral position.

4. In a control device for a transmission shift mechanism shiftable to various operating conditions including a neutral condition, electric switch means for an engine starter, a selector element shiftable to move said mechanism by engagement therewith, said selector element being shiftable to a neutral position to shift said mechanism to said neutral condition, a shiftable operator, keying means at a keying position operably connecting said operator and element for movement in unison, means cooperable with said keying means to hold the same at said keying position throughout movement of said operator and element to said neutral position and being effective to release said keying means from said keying position when said operator and element are at said neutral position, and means cooperable with said operator to actuate said switch means upon predetermined movement of said operator from said neutral position.

5. In a control device for a transmission shift mechanism shiftable to various operating conditions including a neutral condition, electric switch means for an engine starter, a selector element shiftable to move said mechanism by engagement therewith, said selector element being shiftable to a neutral position to shift said mechanism to said neutral condition, a shiftable operator, keying means at a keying position operably connecting said operator and element for movement in unison to shift said selector element to said neutral position upon corresponding shifting of said operator, said keying means being relatively shiftable with respect to said operator from said keying position when said element and operator are at said neutral position, and means for shifting said keying means relatively with respect to said operator from said keying position upon movement of said operator from said neutral position to a second position, and means cooperable with said operator and engageable with said switch means to actuate the latter upon movement of said operator to said second position.

6. In a control device for a transmission shift mechanism shiftable to various operating conditions including a neutral condition, electric switch means for an engine starter, a selector element shiftable to move said mechanism by engagement therewith, said selector element being shiftable to a neutral position to shift said mechanism to said neutral condition, a shiftable operator, keying means shiftable to a keying position for operably connecting said element and operator for movement in unison, guide means confining said keying means at the keying position throughout movement of said operator and element to said neutral position and being effective to release said keying means from said keying position when said operator and element are at said neutral position, means on said operator effective to shift said keying means from the keying position upon movement of said operator in a given direction from the neutral position, means on said operator effective to actuate said switch means upon predetermined movement of said operator in said direction, and movement limiting means for blocking movement of said element in said direction from the neutral position.

7. The combination according to claim 6 and comprising in addition means cooperable with the keying means at the neutral position for yieldingly urging the same to the keying position.

8. In an automotive vehicle having an engine and power driven means, a multiple-position transmission operatively connecting said engine and driven means and being shiftable to a neutral condition whereat said engine is disengaged from said driven means, switch means for an electric starting motor, a transmission position-control mechanism having a shiftable selector element shiftable to a neutral position for shifting said mechanism to the neutral condition, a shiftable operator, resilient driving means operatively connecting said element and operator to shift said element to said neutral position and said mechanism to the neutral condition upon predetermined shifting of said operator in a given direction, said operator having a portion effective to actuate said switch means upon continued movement of said operator in said direction after said element is shifted to the neutral position, and movement limiting means for retaining said element at the neutral position upon said continued movement of said operator.

9. In an automotive vehicle having an engine and power driven means, a multiple-position transmission operatively connecting said engine and driven means and being shiftable to a neutral position whereat said engine is disengaged from said driven means, switch means for an electric starting motor, a transmission position-control mechanism having a shiftable selector element for shifting said mechanism to the neutral position, a shiftable operator, means operatively connecting said element and operator to shift said element and mechanism to the neutral position upon predetermined shifting of said operator in a given direction, said operator having a portion effective to actuate said switch means upon continued movement of said operator in said direction after said element is shifted to the neutral position, and movement limiting means for retaining said element at the neutral position upon said continued movement of said operator.

10. In a multiple speed power transmission mechanism for an engine powered wheeled vehicle including gear elements capable of transmitting power from the vehicle engine to a power output member, said engine including an electric starter motor and an electric starter motor circuit, and said mechanism including gear control means for controlling the motion of said gear elements to accommodate a torque delivery through said mechanism with any of a plurality of torque multiplication ratios; gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means, a plurality of key members slidably mounted in said frame for reciprocation in a direction transverse to said axis, each key being formed with a pair of cradle engaging shoulders, the relative spacing of the shoulders of each key in the direction of reciprocation being different from the corresponding spacing of the shoulders of any of the other keys, the individual shoulders of each key being adapted to engage said cradle on the opposite sides of said axis of oscillation, a push button carried by each key to facilitate manual movement of the latter in one direction into engagement with said cradle, a first and a second of said keys being adapted to adjustably position said cradle throughout a range of operative positions to selectively adjust said control means for respectively effecting forward and reverse drive, a third one of said keys being adapted to adjustably position said cradle to a neutral position, and a starter switch carried by said frame in the line of reciprocation of said third key, said starter switch forming a portion of said starter motor circuit, and said third key contacting and closing said starter switch when it is moved beyond said neutral position.

11. In a multiple speed power transmission mechanism for an engine powered wheeled vehicle including gear elements capable of transmitting power from the vehicle engine to the vehicle traction wheels, said engine including an electric starter motor circuit, gear control means for controlling the motion of said gear elements to accommodate a torque delivery through said mechanism with any of a plurality of torque multiplication ratios; a gear selector means for adjusting said mechanism to adapt the same for operation in any of a plurality of ranges of gear ratios, said gear selector means including a frame, a cradle member pivotally mounted in said frame for rotation about an axis of oscillation, a mechanical connection between said cradle member and a portion of said gear control means, a plurality of key members slidably mounted in said frame for reciprocation in a direction transverse to said axis, a push button carried by each key to facilitate manual movement of the latter in one direction to engage said cradle, one of said keys being adapted to adjustably position said cradle for forward drive operation, another key adapted to adjustably position said cradle for reverse operation, a third key adapted to adjustably position said cradle to a neutral position intermediate the forward drive and reverse positions to render said transmission inoperative, and an electrical switch forming a portion of said starter motor circuit including a portion disposed in the line of reciprocation of said third key, said third key being adapted to actuate said switch upon movement thereof a predetermined distance beyond the neutral position.

12. In a multiple speed power transmission mechanism for a wheeled vehicle having an engine with an electric starter motor circuit, a manually operable transmission range selector mechanism comprising a frame, a movable member mounted within said frame, a mechanical connection between said movable member and a gear regulating portion of said transmission mechanism, a plurality of keys slidably mounted in said frame, each key having portions engageable with said movable member for adjustably positioning the latter upon manual movement thereof relative to said frame, one of said keys being adapted to adjust said movable member to a first position for conditioning said transmission mechanism for forward drive operation, another of said keys being adapted to adjust said movable member to a second position for conditioning said transmission mechanism for reverse operation, a third key being adapted to adjustably position said movable member to a neutral position intermediate said first and second positions, and an electrical switch forming a portion of said starter motor circuit including movable portions situated in the path of movement of said third key, said switch being contacted upon movement of said third key to a position proximate to said neutral position.

13. In a multiple speed power transmission mechanism for a wheeled vehicle having an engine with an electric starter motor circuit, a manually operable transmission range selector mechanism comprising a frame, a movable member mounted within said frame, a mechanical connection between said movable member and a portion of said transmission mechanism, a plurality of keys slidably mounted on said frame, each key having portions engageable with said movable member for adjustably positioning the latter upon manual movement thereof relative to said frame, one of said keys being adapted to adjust said movable member to a first position for conditioning said transmission mechanism for forward drive operation, another of said keys being adapted to subject said movable member to a second position for conditioning said transmission mechanism for reverse operation, a third key adapted to adjustably position said movable member to a neutral position for rendering said transmission mechanism inoperative, and an electrical switch forming a portion of said starter motor circuit including movable portions situated in the path of movement of said third key, said switch being contacted upon movement of said third key to a position proximate to said neutral position.

14. In a control assembly for shifting an automotive transmission to various operating conditions including a neutral condition, a plurality of individually operable transmission actuating elements, each of said elements being movable between two normal positions, one of said elements being movable also to a third position, a selector member shiftable between two normal positions, said selector member being engageable with a portion of said assembly to actuate the same to shift said transmission to said neutral condition upon shifting of said member to one of its normal positions, means releasably interconnecting said one element and member for shifting in unison between said two normal positions, and switching means for energizing an electrical engine starting motor, said switching means being mounted in said assembly and actuatable by said one element when said one element is moved to its third position.

15. In an automotive vehicle having a transmission shiftable to multiple operating positions including a neutral position, a transmission control assembly comprising a plurality of individually operable transmission actuating elements, each of said elements being movable in the same direction from an inoperative position to an operating position for shifting said transmission to one of the latter's multiple operating positions, one of said elements being a neutral element effective at its operating position to shift said transmission to said neutral position and being also movabe in said direction beyond its operating position to a third position, and switching means for energizing an electrical engine starting motor, said switching means being mounted in said assembly and actuatable by said neutral element when the latter is moved to its third position.

16. In an automotive vehicle having an engine and power driven means, a multiple-position transmission operatively connecting said engine and driven means and being shiftable to a neutral condition whereat said engine is disengaged from said driven means, switch means for an electric starting motor, a transmission position-control mechanism operatively connected with said transmission for shifting the same to various operating conditions including said neutral condition, personally actuated neutral operating means movable in a given direction from an inoperative position out of engagement with said mechanism to a neutral position in engagement with said mechanism to shift said transmission to said neutral condition, said neutral operating means also having a portion effective to actuate said switch means when said operating means is shifted in said one direction beyond said neutral position.

17. In a control assembly for an engine transmission, switch means for actuating an electrical starting motor for said engine, transmission control means operably associated with said transmission and being shiftable to a predetermined position to shift said transmission to a neutral condition, neutral selector means having a portion engageable with said control means to shift the same to said predetermined position upon shifting of said selector means to a neutral condition and having another portion engageable with said switch means to actuate the same upon shifting of said selector means to a second condition, and means on said selector means separate from the first named portion and engageable with said control means to hold the latter at said predetermined position upon shifting of said selector means to said second condition, 18. In a control assembly for an engine transmission, switch means for actuating an electrical starting motor for said engine, transmission control means operably associated with said transmission and being shiftable to a predetermined position to shift said transmission to a neutral control condition, neutral selector means having a portion engageable with said switch means to actuate the same upon shifting of said selector means to an engine starting position, abutment portions yieldingly carried by said selector means and engageable with said control means to shift the latter to said predetermined position upon shifting of said selector means to a neutral position, said abutment portions being yieldable at said neutral position to enable shifting of said selector means to said engine starting postiion, and means on said selector means separate from said abutment portions and engageable with said control means to hold the latter at said predetermined position upon shifting of said selector means to said starting position.

19. In a control assembly for an engine transmission, switch means for actuating an electrical starting motor for said engine, transmission control means operably associated with said transmission and being shiftable to a predetermined position to shift said transmission to a neutral condition, neutral selector means having a portion engageable with said control means to shift the same to said predetermined position upon shifting of said selector means to a neutral condition and having another portion engageable with said switch means to actuate the same upon shifting of said selector means to a second condition, said selector means also having a third portion engaging said control means when shifted to said second condition to hold said control means positively at said predetermined position.

20. In a control assembly for an engine transmission, switch means for actuating an electrical starting motor for said engine, transmission control means operably associated with said transmission and being shiftable to a predetermined position to shift said transmission to a neutral condition, neutral selector means having a portion engageable with said switch means to actuate the same upon shifting of said selector means to an engine starting position, resilient means connecting said selector means and control means effective to shift the latter to said predetermined position upon shifting of said selector means to a neutral position, said resilient means being yieldable at said neutral position to enable shifting of said selector means to said engine starting position, said selector means having a lost motion slot therein, said control means having a portion fixed therewith and extending into said slot for movement therein relative to said selector means, an edge of said slot engaging the last named portion of said control means to hold the latter at said predetermined position upon shifting of said selector means to said starting position.

21. In a control assembly for an engine transmission, switch means for actuating an electrical starting motor for said engine, transmission control means operably associated with said transmission and being shiftable to a predetermined position to shift said transmission to a neutral condition, neutral selector means having a portion engageable with said control means to shift the same to said predetermined position upon shifting of said selector means to a neutral condition and having another portion engageable with said switch means to actuate the same upon shifting of said selector means to a second condition, said selector means having a lost motion slot therein, said control means having a portion fixed therewith and extending into said slot for movement therein relative to said selector means, an edge of said slot engaging the last named portion of said control means to hold the latter at said predetermined position upon shifting of said selector means to said second condition.

22. In a control assembly for an engine transmission, switch means for actuating an electrical starting motor for said engine, transmission control means operably associated with said transmission and being shiftable to a predetermined position to shift said transmission to a neutral condition, neutral selector means having a portion engageable with said switch means to actuate the same upon shifting of said selector means to an engine starting position, resilient means operably connecting said selector means and control means effective to shift the latter to said predetermined position upon shifting of said selector means to a neutral position, said resilient means being yieldable at said neutral position to enable shifting of said selector means to said engine starting position, and means on said selector means separate from said resilient means and engageable with said control means to hold the latter at said predetermined position upon shifting of said selector means to said starting position.

References Cited in the file of this patent

UNITED STATES PATENTS

| | | |
|---|---|---|
| 2,234,405 | Hall et al. | Mar. 11, 1941 |
| 2,489,544 | Schwarz et al. | Nov. 29, 1949 |
| 2,514,963 | McRae | July 11, 1950 |
| 2,552,789 | Hopkins | May 15, 1951 |
| 2,610,518 | Goedeke et al. | Sept. 16, 1952 |
| 2,622,138 | Cooper | Dec. 16, 1952 |
| 2,661,730 | Schneider et al. | Dec. 8, 1953 |
| 2,685,873 | Cooke | Aug. 10, 1954 |
| 2,695,366 | Coffey | Nov. 23, 1954 |

OTHER REFERENCES

Mercury Chassis Parts Manual (1949–1951).
Mercury Chassis and Adjustment Manual (1952).